United States Patent [19]
Cane et al.

[11] Patent Number: 6,157,931
[45] Date of Patent: *Dec. 5, 2000

[54] DATABASE/TEMPLATE DRIVEN FILE SELECTION FOR BACKUP PROGRAMS

[75] Inventors: David Cane, Sudbury; David Hirschman, Sharon; Philip Speare, Arlington; Lev Vaitzblit, Concord, all of Mass.

[73] Assignee: Connected Corporation, Framingham, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/984,015

[22] Filed: Dec. 3, 1997

Related U.S. Application Data

[60] Provisional application No. 60/037,597, Feb. 11, 1997.

[51] Int. Cl.[7] .................................................. G06F 17/30
[52] U.S. Cl. .................................... 707/204; 707/10
[58] Field of Search ........................ 707/10, 204

[56] References Cited

U.S. PATENT DOCUMENTS

| 5,276,867 | 1/1994 | Kenley et al. | 707/204 |
| 5,485,606 | 1/1996 | Midgdey et al. | 707/10 |
| 5,638,509 | 6/1997 | Dunphy et al. | 395/182.18 |
| 5,664,186 | 9/1997 | Bennett et al. | 707/204 |
| 5,765,173 | 6/1998 | Cane et al. | 707/204 |

*Primary Examiner*—Hosain T. Alam
*Assistant Examiner*—Sanjn Shah
*Attorney, Agent, or Firm*—Weingarten, Schurgin, Gagnebin & Hayes LLP

[57] ABSTRACT

A database of known commercial software programs ("Products") is maintained and employed as a template for selection of files for a backup operation. In particular, files which are part of known Products may be excluded during backup operations. Records indicating rules about which files within Product directories are included and excluded from the backup operation are also maintained in the database. Product directories may be determined from a registry or the hard disk may be scanned and directories checked against a list of known Product default directories. If the newly found directory does not match an entry in the list of default directories, then file list codes in the database are checked against the files in the directory to determine whether known Product files are present in the directory. Two types of exclusion commands are employed to identify files for exclusion from the backup operation by exploiting file creation and modification dates. The first command type establishes a baseline date by looking at the last modification date of the file. The second command type instructs the backup program to exclude selected files in selected subdirectories in accordance with predetermined criteria.

19 Claims, 2 Drawing Sheets

DATABASE/TEMPLATE DRIVEN FILE SELECTION FOR BACKUP PROGRAMS

CROSS-REFERENCE TO RELATED APPLICATIONS

Priority is claimed to U.S. Provisional Patent Application No. 60/037,597 entitled FILE COMPARISON FOR DATA BACKUP AND FILE SYNCHRONIZATION, filed Feb. 11, 1997.

BACKGROUND OF THE INVENTION

The present invention is generally related to data backup systems, and more particularly to file identification and classification techniques for improved efficiency in data backup systems.

Techniques for improving the efficiency of data backup systems are known. For example, in an "incremental backup" only those files which have changed since the most recent backup operation are saved. Changed files are identified by techniques such as comparing the modification date associated with each file with a record of modification dates stored during the previous backup. While this technique is more efficient than saving every file on the system during each backup operation, substantially less effort would be required if other files could be identified and excluded from the backup operation.

BRIEF SUMMARY OF THE INVENTION

In accordance with the present technique, a database of known commercial software programs ("Products") is generated and employed as a template for selection of files for a backup operation. In particular, selected files which are part of known Products are excluded during backup operations. Records indicating rules about which files within the Product records are included and excluded from the backup operation are also maintained in the database. In order to establish the Product records the directory in which each Product has been installed is determined, and the files within the Product that must be included and excluded from the backup operation are identified. Product directories may be identified by employing a Registry, examining known Product default directories, searching for directories containing a plurality of known Product files, and searching for directories having a plurality of executable files with common respective creation dates. Creation and modification dates may also be employed for selectively excluding files within a Product directory from the backup operation.

BRIEF DESCRIPTION OF THE DRAWING

The present invention will be more fully understood in view of the following Detailed Description of the Invention, in conjunction with the Drawing, of which.

DETAILED DESCRIPTION OF THE INVENTION

Figure 1:
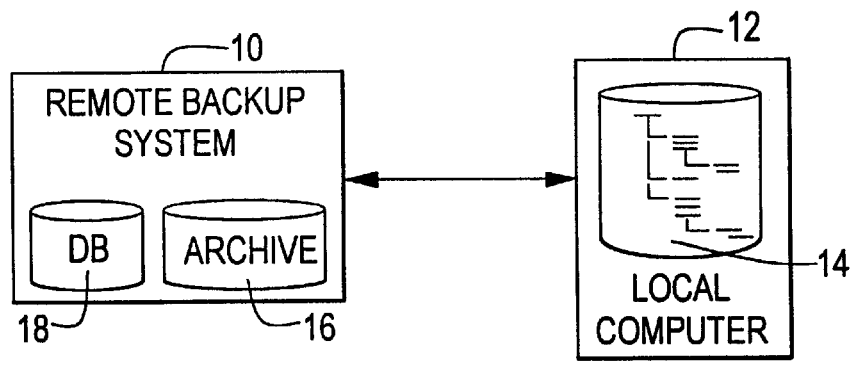
FIG. 1 is a block diagram illustrating a remote backup system.

Referring to FIG. 1, a remote backup system 10 is periodically connected to a computer system 12 to execute a backup operation. In the backup operation, copies of files in storage on a hard disk 14 in the computer system 12 are transferred to and stored on a hard disk 16 in the remote backup system 10.

To provide efficient backup, a database 18 of directories and files is maintained in the remote backup system 10 to be employed as a template for exclusion of files for the backup operation. In particular, user-generated files and files that are available from other sources, such as commercial software products ("Products"), are identified and excluded from backup. Generally, it is desirable to backup user generated files, including user modified Product files, because no archival copies exist, and undesirable to backup non-user generated Product files since archival copies often do exist. The database 18 contains Product records which indicate a known set of Products, and rules about which files within the Product records and associated directories are included and excluded from the backup operation. The Product records indicate the directory in which each Product has been installed, and rules for excluding files within the directory from the backup operation. In particular, each individual Product record in the database includes identification and exclusion information such as listed in example Table 1.

TABLE 1

| Entry | Description |
|---|---|
| [Access\|7.0\|32] | Name of Product |
| DefDir=C:\MSOffice\Access | Default directory where product is installed |
| Files=msaccess.exe\|WZMAIN70.MDA | List of files to identify product |
| $Date=msaccess.exe | Definition of release date |
| Exc1=\|*.*\|SUB$Date | Exclusion of all files matching release date |
| Exc2=\|WZMAIN70.MDA | Exclusion of a file regardless of date |

Figure 2:
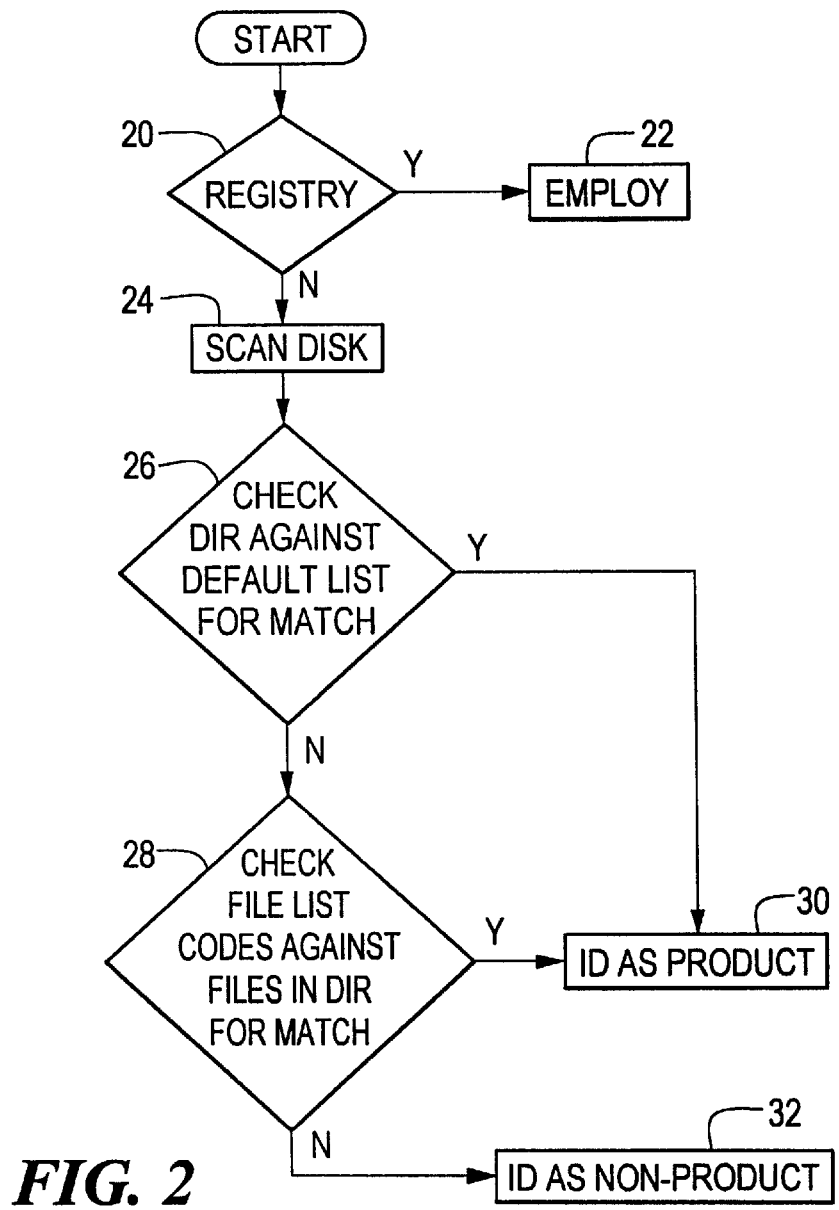
FIG. 2 is a flow diagram illustrating a method for identifying the directory associated with each Product on each individual computer system.

Referring now to Table 1 and FIG. 2, which illustrates a method for identifying the directory associated with each Product on each individual computer system, products are often installed into a "default directory" where installation will take place if the user does not specify otherwise. Under the Microsoft Windows95 operating system, the directory where the Product is installed is recorded in a system database, known as the "Registry." However, under most other operating systems there is no single place where the location of the installation directory for a Product can be located. If a Registry exists on the individual computer system, as determined in step 20, then that Registry is employed to identify directories that contain Product files as depicted in step 22. However, if no Registry exists on the individual computer system then the Product directories must be determined by other means.

To determine the Product directories for a hard disk when no Registry exists, the hard disk is scanned as shown in step 24. When a new directory is found, that directory is checked against a list of known default directories for Products as shown in step 26. The list is maintained in the remote backup system and the default directory could be coded as DefDir= C:\MSOffice\Access, for example. If a match is found in step 26, the directory is identified as a Product directory as shown in step 30.

If the newly found directory does not match an entry in the list of default directories, then file list codes in the database are checked against the files in the directory as shown in step 28. In particular, the database is coded with a list of signature files that uniquely identify each Product of interest. This list includes a set having at least one file name that when found in a single directory uniquely identify a Product, and hence the Product directory. An example of such a coding is: Files=msaccess.exe|WZMAIN70.MDA. This coding describes two files named Msaccess.exe and WZMAIN70.MDA, respectively. When found together in a directory these two files uniquely identify that directory as a Product directory; in this case the directory containing Microsoft Access, Version 7. If a match is found in step 28, then the directory is identified as a Product directory as shown in step 30. If no match is found in step 28, then the directory is identified as a non-Product directory as depicted in step 32. Product directories may also be found be searching for directories containing a plurality of executable files sharing a common creation date.

Figure 3:
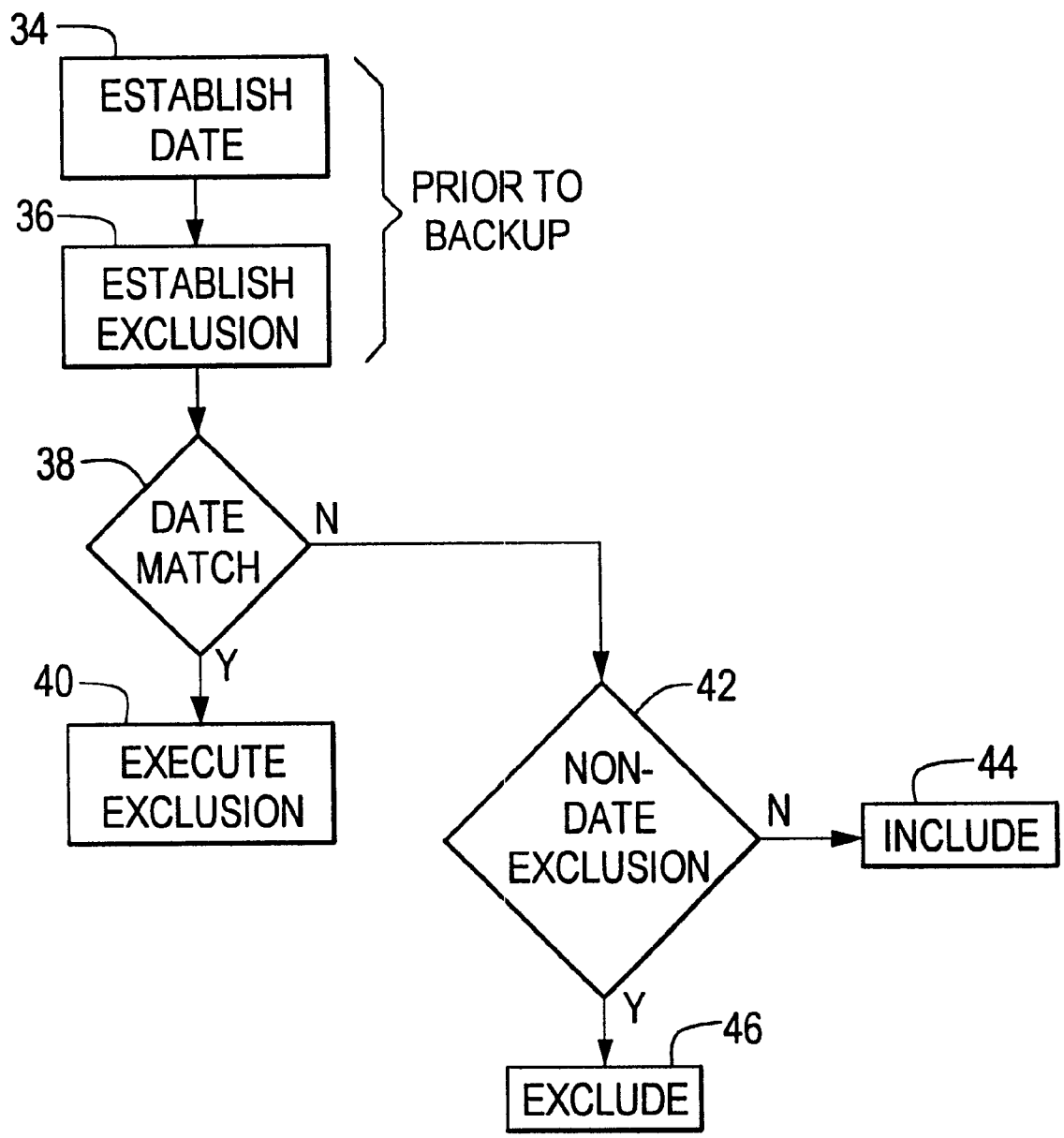
FIG. 3 is a flow diagram illustrating a method for coding exclusion and inclusion rules, and using modification dates.

FIG. 3 illustrates a method for coding exclusion and inclusion rules, including selection by modification and creation dates. Prior to the backup operation, a baseline date and exclusion rules for the files associated with a given Product are established as shown in steps 34 and 36, respectively. When the backup operation executes, each encountered file on the computer system hard disk is matched against the date specified in the database for that directory as shown in step 38. If a match is found, the exclusion rule is implemented as shown in step 40. If there is no match, the file may still have a non-date exclusion applied thereto as depicted in step 42. If the file is not excluded from the backup operation in step 42 then the file is included in the backup operation as depicted in step 44. Otherwise, the file is excluded as shown in step 46.

Product directories typically have a large number of files, and it may be desirable to exclude only a portion of these files from the backup operation. Two commands are employed to identify a selected portion of the files by exploiting file modification and/or creation dates. The following two lines provide an example coding method:

$Date=msaccess.exe

Excl=|*.*|SUB|$Date

The first line in the coding method establishes a baseline date by looking at the last modification date of the file, here msaccess.exe. The second line instructs the backup program to exclude (from the Excn to the left of the equal sign) all files (*.*) in all subdirectories (SUB) whose modification date matches the modification date of the msaccess.exe ($Date) file. This technique functions effectively for Products where the manufacturer sets the modification dates of all files to be equal at the time of Product release. It also has the property that if a user modifies one of the Product files, then that file will have a different modification date and will not be excluded from the backup operation.

This coding method also allows flexibility in selecting individual files as well as groups. The line Exc2= |WZMAIN70.MDA specifies that the file WZMAIN70.MDA should always be excluded, regardless of modification date. The reason for such exclusion may be because the file is a large file containing information that can be reconstructed in other ways and the expense and time of backing it up should not be taken with each backup.

Having described the preferred embodiments of the invention, other embodiments which incorporate the concepts of the invention will now become apparent to one of skill in the art. Therefore, the invention should not be viewed as limited to the disclosed embodiments but rather should be viewed as limited only by the spirit and scope of the appended claims.

What is claimed is:

1. A system for storing an archival copy of selected files from a first storage media on a second storage media, comprising:

a product database having a list of product directories indicating at least a first set of non-user generated files in each of said product directories in said list;

a backup routine which excludes at least one non-user generated file in the first set of files in each of said product directories in said list from backup operations such that no archival copy of said at least one non-user generated files in the first set of files in each of said product directories in said list is stored on the second storage media, wherein user generated files can be distinguished from non-user generated files; and an exclusion routine having a set of predetermined exclusion rules for each of said product directories in said list adapted to determine which of said non-user generated files in each of said product directories in said list in said first storage media are to be excluded.

2. The system of claim 1 wherein the first set of files in each of said product directories in said list are computer program product files.

3. The system of claim 1 wherein the list includes at least one record of a default directory associated with a known software program.

4. The system of claim 3 wherein every file in such default directory is excluded from backup operations.

5. The system of claim 3 wherein a portion of the files in such default directory are excluded from backup operations in accordance with at least one exclusion rule.

6. The system of claim 3 wherein a portion of the files in such default directory sharing a predetermined, common creation date are excluded from backup operations, in accordance with an exclusion rule.

7. The system of claim 3 wherein every file in such default directory sharing a predetermined, common creation date is excluded from backup operations.

8. The system of claim 1 wherein the product database of product directories is generated from a registry of software programs maintained on the first storage medium.

9. The system of claim 1 wherein the product database of product directories is generated by identifying directories on the first storage media which contain at least one signature file associated with a respective computer product.

10. The system of claim 1 wherein the product database of product directories is generated by identifying directories on the first storage media which contain a plurality of executable files having common respective modification dates, wherein said plurality of executable files are associated with a respective product.

11. A method for storing an archival copy of selected files from a first storage media on a second storage media, comprising the steps of:

identifying a list of product directories;

generating a list for each product directory in the list indicating at least a first set of non-user generated files, and storing each list associated with each product directory in a product database;

generating a set of predetermined exclusion rules for each product directory in the list adapted to determine which of said files in the are to be copied and which of said files are to be excluded from said archival copy;

selectively executing a backup routine that excludes at least one non-user generated file in the first set of non-user generated files for each product directory in the list from backup operations as indicated by said set of predetermined exclusion rules for each product directory in the list such that no archival copy of such files is stored on the second storage media, whereby user generated files are distinguished from non-user generated files.

12. The method of claim 11 wherein the step of identifying includes the step of identifying a product directory containing at least one predetermined signature file associated with a respective product.

13. The method of claim 11 including the further step of placing at least one record of a default directory associated with a known software program in the list.

14. The method of claim 13 including the further step of excluding every file in such default directory from backup operations.

15. The method of claim 13 including the further step of excluding a portion of the files in such default directory from backup operations in accordance with at least one exclusion rule.

16. The method of claim 13 including the further step of excluding a portion of the files in such default directory sharing a predetermined, common creation date from backup operations, in accordance with an exclusion rule.

17. The method of claim 13 including the further step of excluding every file in such default directory sharing a predetermined, common creation date from backup operations.

18. The method of claim 11 wherein the step of identifying includes using a registry of software programs maintained on the first storage media to identify a list of product directories.

19. The method of claim 11 wherein the step of identifying a list of product directories includes the steps identifying a plurality of executable files having common modification dates, wherein said plurality of executable files are associated with a respective product.

* * * * *